United States Patent
Tanaka et al.

(10) Patent No.: US 6,513,382 B2
(45) Date of Patent: Feb. 4, 2003

(54) ACCELERATION SENSOR

(75) Inventors: Hiroshi Tanaka, Nagano (JP);
Katsuhiro Sawada, Nagano (JP);
Masanori Yachi, Nagano (JP);
Masaaki Ono, Nagano (JP); Hiroshi Ishikawa, Kawasaki (JP)

(73) Assignees: Fujitsu Limited, Kawasaki (JP);
Fujitsu Media Devices Ltd., Nagano (JP)

(*) Notice: Subject to any disclaimer, the term of this patent is extended or adjusted under 35 U.S.C. 154(b) by 0 days.

(21) Appl. No.: 09/834,958

(22) Filed: Apr. 16, 2001

(65) Prior Publication Data

US 2002/0059830 A1 May 23, 2002

(30) Foreign Application Priority Data

Nov. 17, 2000 (JP) ........................... 2000-351058

(51) Int. Cl.7 .................................... G01P 15/00
(52) U.S. Cl. ........................... 73/514.01; 73/514.34
(58) Field of Search ................... 73/514.01, 514.15, 73/514.16, 514.34; 310/311, 313 A, 365

(56) References Cited

U.S. PATENT DOCUMENTS 4,625,137 A * 11/1986 Tomono ................. 310/317
4,868,447 A * 9/1989 Lee et al. ................ 310/328

FOREIGN PATENT DOCUMENTS

| DE | 199 42 573 | 9/1998 |
|---|---|---|
| EP | 0 616 221 | 9/1994 |
| JP | 8-43432 | 2/1996 |
| JP | 11-118823 | 4/1999 |
| JP | 11-211748 | 8/1999 |
| JP | 2001-349900 | 12/2001 |

\* cited by examiner

*Primary Examiner*—Richard A. Moller
(74) *Attorney, Agent, or Firm*—Armstrong, Westerman & Hattori, LLP

(57) ABSTRACT

A small-sized, high detection sensitivity and high performance acceleration sensor having directional or non-directional sensitivity is disclosed. The acceleration sensor is provided with a vibrator having uni-directional polarization and a weight connected to the vibrator. The weight is supported at the position different from the center of gravity of the total body of the vibrator and the weight itself. The vibrator is disposed so that its direction of polarization axis is either consistent or inconsistent with an axis of the torsion of the vibrator.

9 Claims, 7 Drawing Sheets

— All cut (dicing)
--- Electrode cut (etching)

— All cut
--- Electrode cut

FIG. 8A

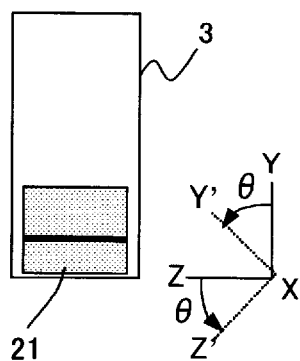

FIG. 8B

| θ (deg) | Acceleration applied axis | | | Acceleration detection axis |
|---|---|---|---|---|
| | Z axis | X axis | Y axis | |
| 0 | +V / -V | -V \| +V | -V \| +V | One axis (Z axis) |
| 45 | +V / -V (diagonal) | +V / -V (diagonal) | +V | Three axes (X,Y,Z axes) |
| 90 | -V \| +V | +V / -V | +V | Two axes (X,Y axes) |

※ ---- Phase boundary of potential (V)

Example of potential distribution

FIG. 9A

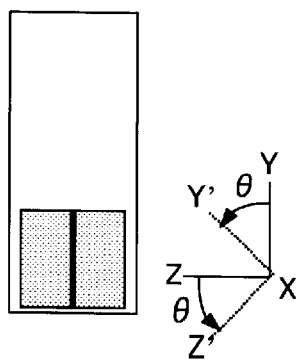

FIG. 9B

| θ (deg) | Acceleration applied axis | | | Acceleration detection axis |
|---|---|---|---|---|
| | Z axis | X axis | Y axis | |
| 0 | +V / -V | -V \| +V | -V \| +V | Two axes (X,Y axes) |
| 45 | +V / -V (diagonal) | +V / -V (diagonal) | +V | Three axes (X,Y,Z axes) |
| 90 | -V \| +V | +V / -V | +V | Two axes (Y,Z axes) |

※ ---- Phase boundary of potential (V)

Example of potential distribution

30 Symmetry center line of weight
31 Symmetry center line of piezoelectric vibrator

FIG. 12A
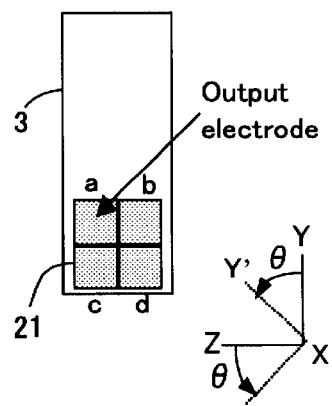
FIG. 12B
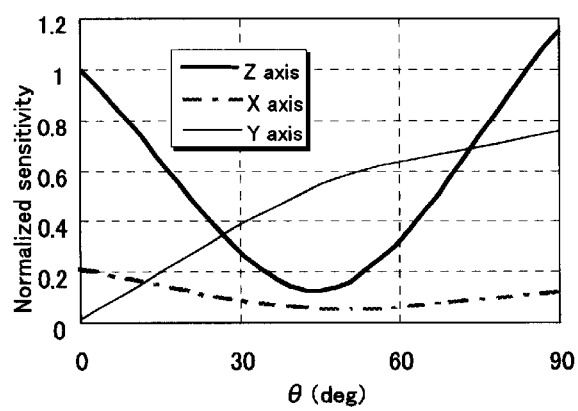
FIG. 13A
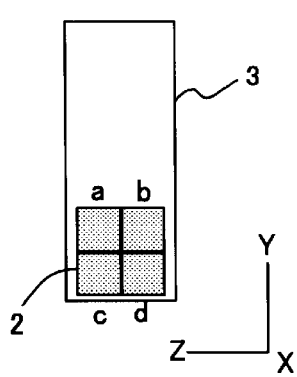
FIG. 13B
| | Acceleration applied axis | | |
|---|---|---|---|
| Potential distribution | Z axis | X axis | Y axis |
| | +V +V / −V −V | +V −V / +V −V | +V −V / +V −V |
FIG. 14A
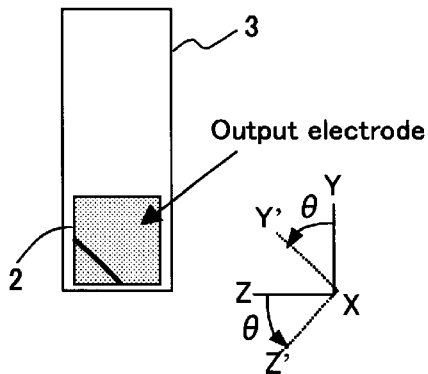
FIG. 14B
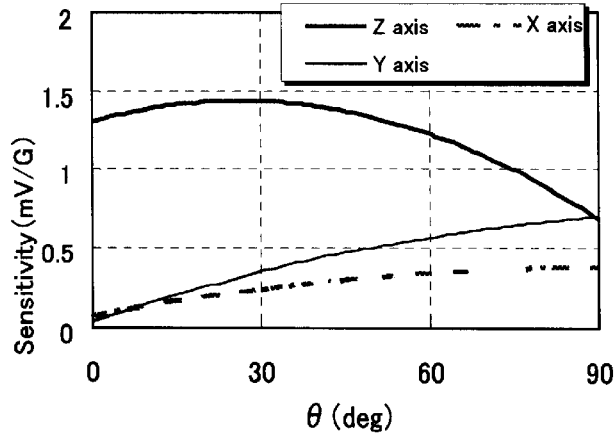

ACCELERATION SENSOR

FIELD OF THE INVENTION

The present invention relates to a piezoelectric acceleration sensor to be used for detecting impact and acceleration applied to a body, more particularly an acceleration sensor for detecting characteristic quantity generated by an inertia force resulting from the acceleration.

BACKGROUND OF THE INVENTION

In recent years, most electronic equipment is becoming smaller in size. Portable equipment such as a notebook personal computer (PC) is widely used today. There may be a case that such equipment receives an unpredictable impact. It is therefore required to detect the impact so that appropriate measures can be taken for maintaining reliable operation of the equipment.

For example, on a hard disk drive (HDD) mounted in a notebook PC or a desk top PC, an acceleration sensor is being used to prevent a drive read/write error possibly produced when receiving impact. In particular, in case of a notebook PC, an HDD usually receives acceleration in a vertical direction against an HDD face caused by keyboard typing, as well as in a parallel direction to the HDD face caused by read/write operation of the head. Therefore it is necessary to detect acceleration in either direction mentioned above.

As equipment becomes smaller in size with higher performance, a smaller sized, higher performance sensor capable is correspondingly required for detecting acceleration in two or more axial directions; an axial direction along a plane and an axial direction perpendicular to that plane.

Conventionally, a piezoelectric acceleration sensor capable of detecting biaxial acceleration are known. A method for detecting biaxial acceleration is disclosed in the official gazette of Japanese Unexamined Patent Publication No. Hei-7-20144, in which an acceleration sensing element is mounted obliquely against the bottom face of an equipment case. Other method for detecting biaxial acceleration is disclosed in the official gazette of Japanese Unexamined Patent Publication No. Hei-11-118823, in which a vibrator is obliquely attached on a support body at a predetermined angle against a main face.

Furthermore, in the official gazette of Japanese Unexamined Patent Publication No. Hei-8-43432, there is disclosed a method for detecting biaxial acceleration by providing a polarization of a piezoelectric ceramics disposed obliquely to the vertical direction from a ceramics plane. Also, in the official gazette of Japanese Unexamined Patent Publication No. Hei-11-211748, there is disclosed another method for detecting biaxial acceleration by constituting a weight at the end of a vibrator in an eccentric position against the axial direction.

However, these conventional methods have problems described below: According to the method of obliquely mounting an acceleration detection element, the implementation becomes complicated and costly. The method of providing a support body attached at an angle becomes large in size in a vertical direction and also requires complicated mounting. In the method of providing obliquely disposed polarization, it is necessary to cut a vibrator in a desired direction after being polarized, then to form an electrode thereafter. This causes increased manufacturing process and cost.

Also, the method of forming a weight at the end of a vibrator has a problem that the divergence in forming position causes increased dispersion in sensitivity.

To solve the aforementioned problems, a configuration of an acceleration sensor has been proposed by the applicant of the present invention (refer to the official gazette of Japanese Unexamined Patent Publication No. Hei-2000-97707 and No. Hei-11-375813.)

According to this proposed method, an acceleration sensor provides a vibrator and a weight connected thereto having such a configuration that the weight is supported at a position deviating from the center of gravity of the total body of the vibrator and the weight. With this configuration, rotation moment is generated at the weight when acceleration is applied thereto. By detecting the characteristic quantity in the vibrator (torsion) corresponding to the generated rotation moment, the amount of acceleration can be obtained.

The inventors of the present invention have been further developing a small and high sensitive acceleration sensor without requiring large-sized vibrator.

SUMMARY OF THE INVENTION

Accordingly it is an object of the present invention to provide an acceleration sensor having higher performance in terms of either directional or non-directional detection sensitivity, with a similar configuration to the acceleration sensor previously proposed by the applicants of the present invention.

The basic configuration of the present invention provides a vibrator having uni-directional polarization and a weight connected to the vibrator. The weight is supported at a position deviating from the center of gravity of the entire body consisting of the vibrator and the weight. Further, the polarization axis of the vibrator is formed in a different direction from the torsion axis of the vibrator.

Also, as another aspect of the basic configuration of the present invention, there are provided a vibrator having unidirectional polarization and a weight connected to the vibrator, while the weight is supported at a position deviating from the center of gravity of the entire body consisting of the vibrator and the weight. Here, the polarization axis is formed in a direction identical to the axis of torsion of the vibrator.

In each aforementioned configuration, preferably the vibrator is provided with a plurality of separately disposed detection electrodes to attain the aforementioned object.

Further, preferably the area of one electrode among the plurality of separately disposed electrodes is different from the other electrodes.

Still further, preferably the vibrator and the weight are positioned such that each center position of line symmetry in a width direction mutually deviates.

Still further, preferably the center of gravity of the weight is positioned deviating from the center position of line symmetry in a width direction of the vibrator.

Still further, preferably the vibrator is a piezoelectric vibrator formed of either a piezoelectric single crystal or a piezoelectric polycrystal.

Still further, preferably the separated electrodes of the vibrator is formed through etching, dicing or the like.

Still further, preferably the vibrator is provided with two detection electrodes formed by dividing in parallel with a direction of torsion of the vibrator.

Still further, preferably the vibrator is provided with two detection electrodes which are separated perpendicularly to a torsion direction of the vibrator.

Further scopes and features of the present invention will become more apparent by the following description of the embodiments accompanied by drawings.

BRIEF DESCRIPTION OF THE DRAWINGS

FIGS. 8a and 8B show a fourth embodiment of the present invention.

FIGS. 9A and 9B show a fifth embodiment of the present invention.

FIGS. 12A and 12B show an embodiment of the present invention having a configuration of detection (output) electrodes separated into a plurality of electrodes and the detection output to be obtained from one of these electrodes.

FIGS. 13A and 13B show a configuration for obtaining an output with improved SN ratio, derived from potential distribution characteristics of four electrodes a to d in the embodiment shown in FIG. 12A.

FIGS. 14A and 14B show another embodiment of the present invention in which separated electrodes of piezoelectric vibrator 2 are formed.

DETAILED DESCRIPTION OF THE PREFERRED EMBODIMENTS

The preferred embodiments of the present invention are described hereinafter referring to the charts and drawings, wherein like numerals or symbols refer to like parts.

Figure 1:
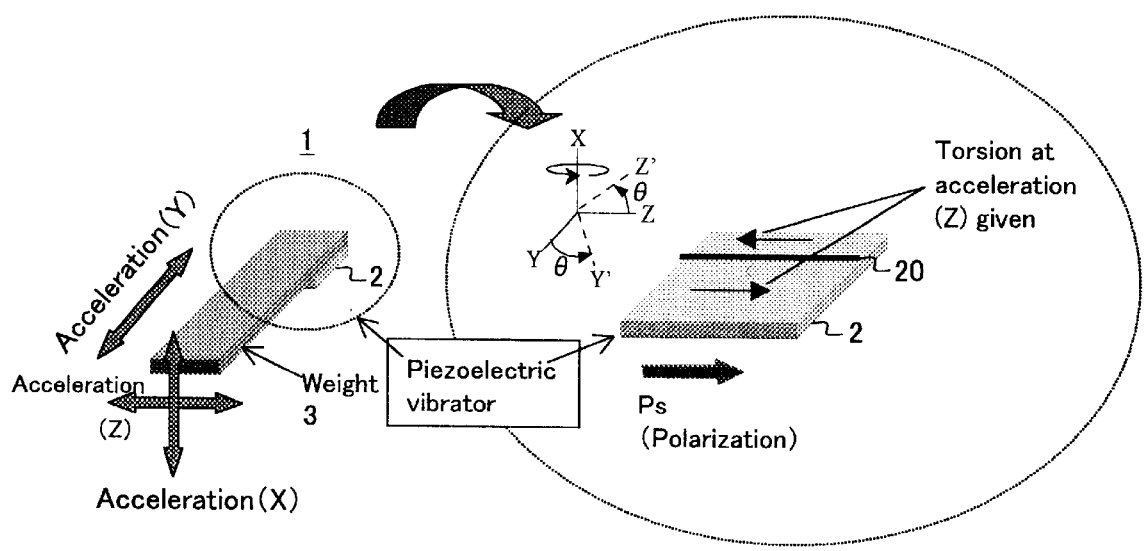
FIG. 1 shows a configuration of an acceleration sensor 1 as a premise of the present invention.

In FIG. 1, there is illustrated an acceleration sensor, which is a prerequisite of the present invention, formerly proposed by the applicants of the invention. In FIG. 1, an acceleration sensor 1 is constituted by a vibrator 2 and a weight 3 connected to vibrator 2. Weight 3 is supported at a position deviating from the center of gravity of the total body of vibrator 2 and weight 3.

Vibrator 2 is formed of piezoelectric ceramics, for example, of which enlarged configuration diagram is shown in the right side of FIG. 1.

A piezoelectric ceramics piece forming vibrator 2 is produced by cutting a ceramic crystal plate. Therefore vibrator 2 is called a piezoelectric vibrator. By applying a high voltage between the both ends of the ceramic crystal plate, polarization Ps is generated in piezoelectric vibrator 2. The cutout piezoelectric ceramics piece therefore provides a unidirectional polarization Ps, as shown in the figure.

As mentioned earlier, piezoelectric vibrator 2 and weight 3 connected thereto are supported at a position deviating from the center of gravity of the entire body. When acceleration is applied onto weight 3, torsion is generated on piezoelectric vibrator 2 in mutually opposite direction at a separation groove (separation pattern) 20. On both surfaces of piezoelectric vibrator 2, non-illustrated electrodes are fixedly formed. As an embodiment, an electrode on one side of piezoelectric vibrator 2 is separately formed, bounded by separation groove (separation pattern) 20, to detect the aforementioned torsion generated in an opposite direction.

When acceleration is applied onto such detection sensor 1 in X, Y and Z direction, a single sensor having configuration feature of the present invention can detect acceleration applied in directions of a plurality of axes.

Figure 2A:
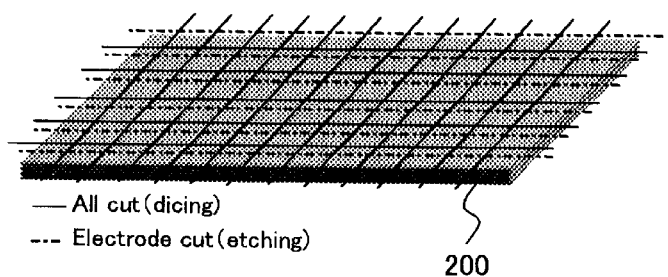
FIGS. 2A and 2B show an example of cutting a piezoelectric ceramics piece to produce a piezoelectric vibrator 2 out of a ceramic crystal plate.
Figure 2B:
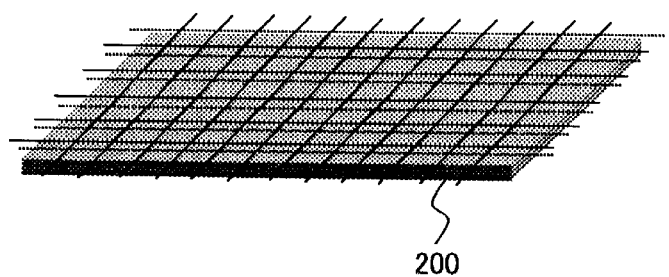

In FIGS. 2A and 2B, there is shown an example of cutting piezoelectric ceramic pieces to produce piezoelectric vibrator 2 from a ceramic crystal plate. In FIG. 2A, an electrode cut is formed through etching to divide an electrode formed on one side of a ceramic crystal plate 200. Once the electrode cut is formed through etching, ceramic crystal plate 200 is separated into ceramic crystal pieces through dicing to produce piezoelectric vibrators 2.

In an example shown in FIG. 2B, dicing such as half-cutting is performed onto a separation groove (separation pattern) 20 of ceramic crystal plate 200 on one side of which an electrode has been produced. Thus ceramic crystal plate 200 is separated into ceramic crystal pieces to produce piezoelectric vibrators 2.

Figure 3A:
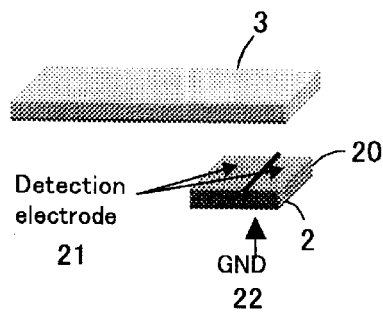
FIGS. 3A and 3B show a detection electrode and a ground electrode respectively formed on the piezoelectric vibrator.
Figure 3B:
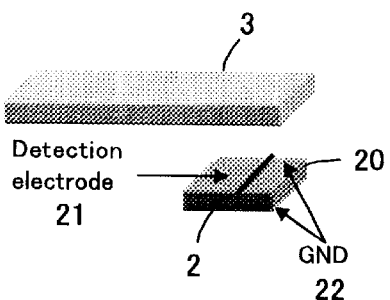

Piezoelectric vibrator 2 formed into a ceramic crystal piece is provided with a detection electrode 21 and a ground electrode 22, as shown in FIGS. 3A and 3B. In an example shown in FIG. 3A, ground electrode 22 is formed on the back face of piezoelectric vibrator 2. Also, detection electrodes 21 are formed on the surface of vibrator 2, each being disposed on each side of separation groove (separation pattern) 20.

In an example shown in FIG. 3B, ground electrodes 22 are formed respectively on the back face of piezoelectric vibrator 2 and one side of the surface separated by separation groove (separation pattern) 20. Also, detection electrode 21 is formed on the other side of the surface.

These separately disposed electrodes on piezoelectric vibrator 2 are formed through etching or dicing, which enables easy and cost-effective manufacturing. Also, it is possible to form the separate electrodes by constructing a separation groove onto a vibration piece through dicing, other than constructing with pattern.

Needless to say, the separate electrodes on piezoelectric vibrator 2 may be formed by either sputtering, baking, evaporating, electrolytic plating, non-electrolytic plating, or the like.

Figure 4A:
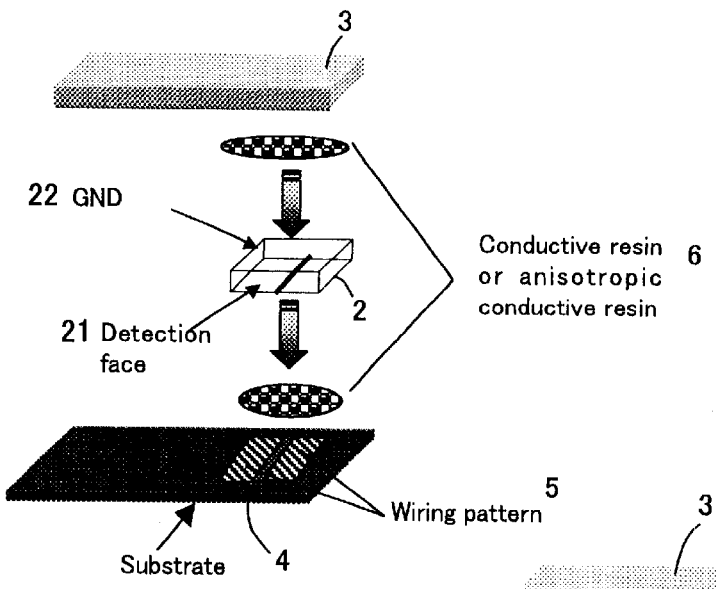
FIGS. 4A and 4B show a configuration of attaching onto a substrate the piezoelectric vibrator 2 and a weight 3 integrally.
Figure 4B:
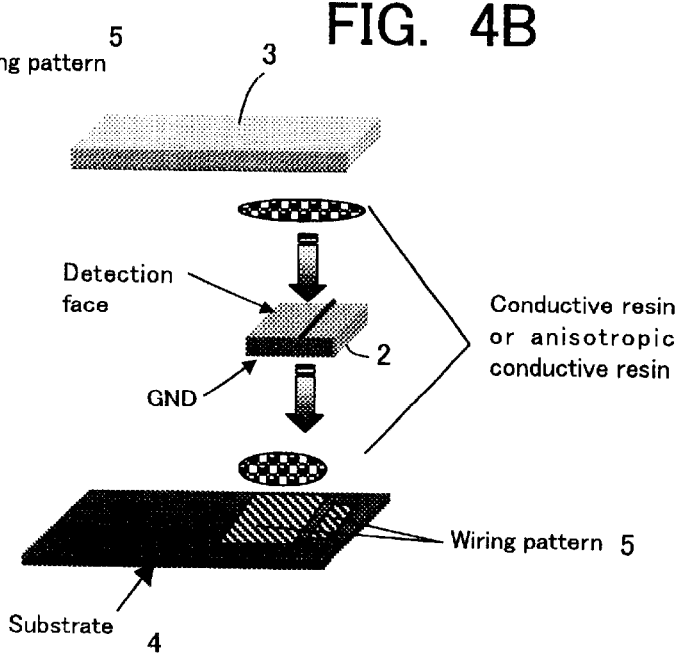

In FIGS. 4A and 4B, there is shown a configuration of mounting weight 3 and piezoelectric vibrator 2 having detection electrode 21 and ground electrode 22 integrally on a substrate as shown in FIGS. 3A and 3B.

In FIG. 4A, a configuration corresponding to piezoelectric vibrator 2 shown in FIG. 3A is illustrated. In this configuration, a plane of piezoelectric vibrator 2 having only ground electrode 22 is placed facing weight 3 through a conductive resin or an anisotropic conductive resin. The other side of the plane of piezoelectric vibrator 2 having detection electrode 21 is fixed onto substrate 4.

Weight 3 is formed of a metal having high density and conductivity. Therefore weight 3 can directly be connected to the ground potential. On substrate 4, there is formed either detection electrode 21 separated by separation groove (separation pattern) 20, or wiring pattern 5 corresponding to ground electrode 22. A signal output detected on detection electrode 21 can be extracted through this wiring pattern 5.

In FIG. 4B, a configuration corresponding to piezoelectric vibrator 2 shown in FIG. 3B is illustrated. In this configuration, opposite to the case shown in FIG. 4A, a plane of piezoelectric vibrator 2 having detection electrode 21, or additionally ground electrode 22, faces weight 3. The other side of the plane of piezoelectric vibrator 2 having ground electrode 22 only is fixed onto substrate 4. Wiring is formed, as a wiring pattern, on substrate 4 corresponding to ground electrode 22 and detection electrode 21. In this example, it is necessary for the wiring corresponding to detection electrode 21 to be connected to weight 3 through a conductive line. This enables to connect wiring pattern 5 on substrate 4 to detection electrode 21 of piezoelectric vibrator 2.

Referring back to FIG. 1, a main feature of the present invention is that the direction of torsion triggered by acceleration applied to Z axis direction and the direction of polarization Ps are disposed either consistently or differently.

Figure 5A:
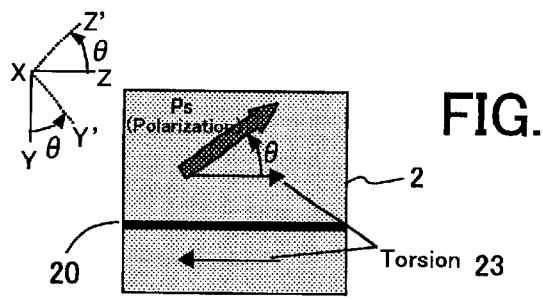
FIGS. 5A and 5B show an embodiment of the present invention.
Figure 5B:
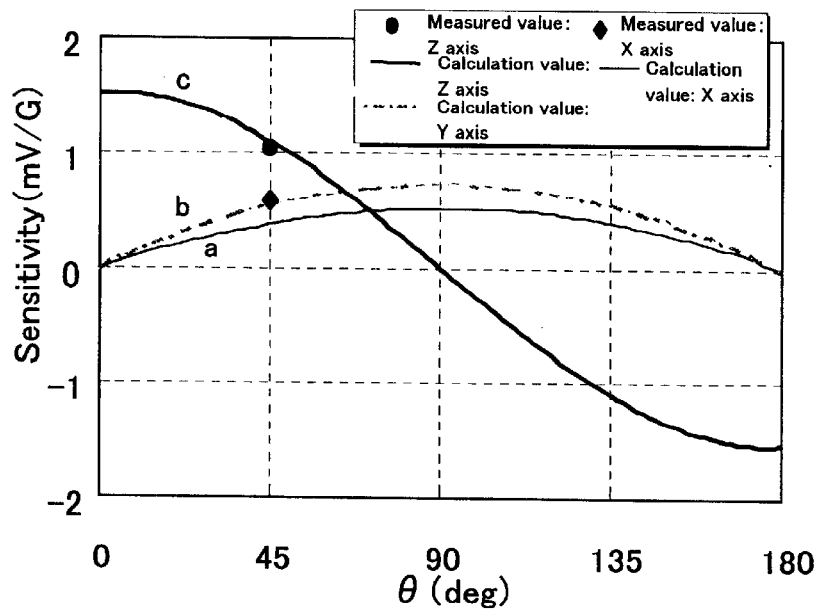

In FIGS. 5A and 5B, there is shown an embodiment of the present invention having the above-mentioned feature. In FIG. 5A, a plan view of piezoelectric vibrator 2 having the configuration shown in FIG. 1 is shown. As mentioned earlier, a height direction of acceleration sensor 1 is defined as X axis. Similarly a longitudinal direction is defined as Y axis, and a width direction is defined as Z axis. The same definition is applicable to the following embodiments.

In this figure, X axis locates in a perpendicular direction to the paper plane, and Z axis locates in a lateral direction parallel to the direction of torsion 23.

According to the configuration of the embodiment, a polycrystal piezoelectric element is used for piezoelectric vibrator 2, of which direction of polarization Ps has a displacement angle of θ to the direction of torsion. In piezoelectric vibrator 2, an axis of torsion (Z axis) is kept constant and only a polarization (Ps) axis is coordinate-rotated (by θ) around X axis.

In such configuration, a study is given on a graph based on measured and calculated value using piezoelectric vibrator 2 shown in FIG. 5A. FIG. 5B is a graph, which illustrates the calculated values indicating the relation between displacement angle θ and sensitivity in FIG. 5A, namely, acceleration detection sensitivity in three axial directions where the torsion axis of piezoelectric vibrator 2 is assumed to be either consistent or inconsistent with the polarization axis.

In FIG. 5B, when the rotation angle of polarization (Ps) θ is set in a range from 1° to less than 90°, an acceleration sensor having non-directional detection sensitivity is realized, with the acceleration detection sensitivity in tri-axial directions 'a', 'b' and 'c' having an identical phase.

On the other hand, when θ is set from 90° to less than 180°, an acceleration sensor having non-directional detection sensitivity is realized, in which the acceleration detection sensitivity in X and Y directions are 'a' and 'b', each having inverse phase against the acceleration sensitivity 'c' in Z direction.

In case θ is set to 90°±15°, an acceleration sensor having bi-axial directions X and Y is obtained having no sensitivity against acceleration in Z direction.

Accordingly, by setting the torsion axis (Z direction) of piezoelectric vibrator 2 inconsistent with the polarization axis Ps, a non-directional acceleration sensor using a single piezoelectric vibrator can be realized, which is capable of detecting acceleration having more than two axial directions.

On the contrary, it is to be understood that the improved directivity of acceleration detection to the torsion axis can be attained by setting the torsion axis of piezoelectric vibrator 2 consistent with the polarization axis Ps. For example, in case θ is set to either 0°±15° or 180°±15°, directivity of the detection sensitivity in Z axis direction can be improved.

Figure 6A:
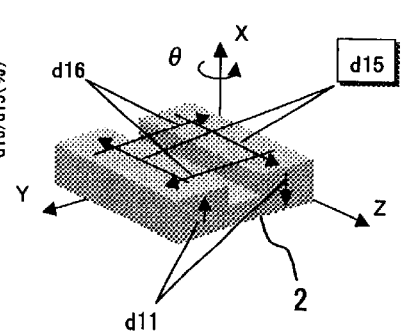
FIGS. 6A and 6B show a second embodiment of the present invention.
Figure 6B:
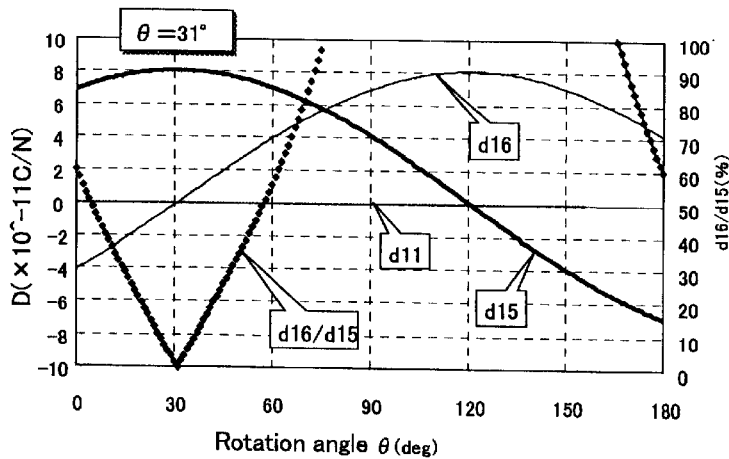

In FIGS. 6A and 6B, there is shown a second embodiment of the present invention. In FIG. 6A, a single crystal piezoelectric element of LiNbO$_3$ is used for piezoelectric vibrator 2. In FIG. 6B, a coordinate transformation of the piezoelectric d constant is shown.

As shown in FIG. 6A, in an LiNbO$_3$-X cut, a piezoelectric constant d15 affects Z axis sensitivity. Also d11 and d16 respectively affect X and Y sensitivity. An Eulerian angle θ represents a value of coordinate transformation around X axis.

As shown in FIG. 6B, d11 is zero in the LiNbO$_3$-X cut, with which the directivity of acceleration in Z axis direction is improved. Namely, by setting θ=31°±15°, d15 becomes maximum and d16 becomes minimum, while d11 is zero. Thus improved directivity of acceleration in Z axis direction is realized with high sensitivity.

Moreover, by setting θ to either 60°±15° or 0°±15°, large d16 can be obtained while maintaining large value of d15. Thus, non-directional bi-axial acceleration sensor is realized.

Figure 7A:
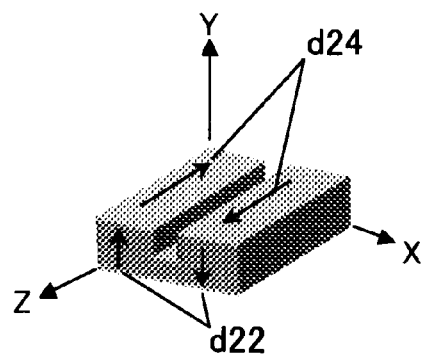
FIGS. 7A and 7B show a third embodiment of the present invention.
Figure 7B:
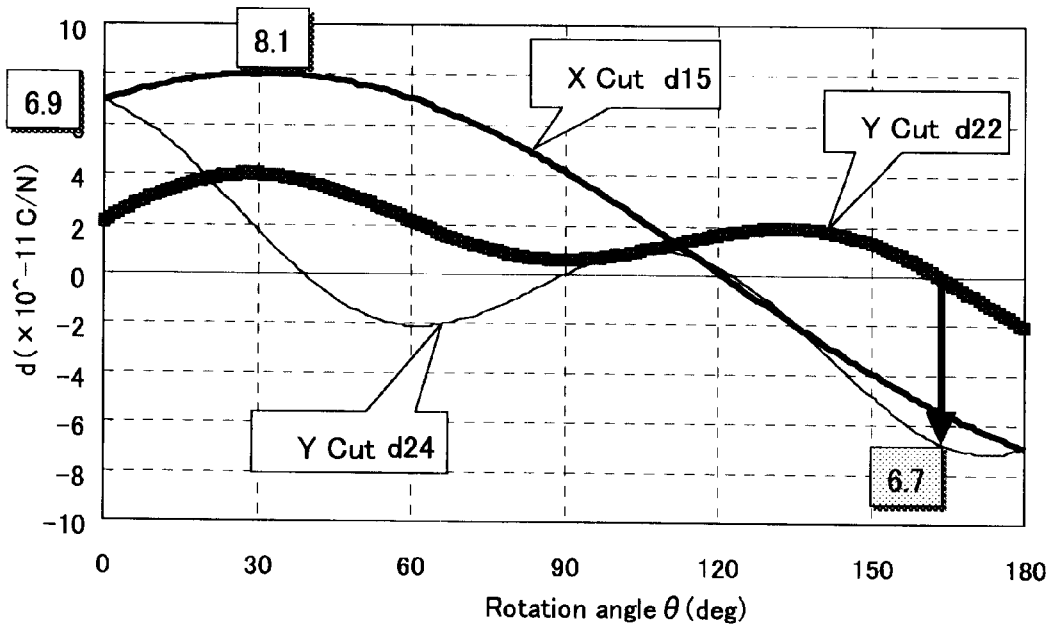

In FIGS. 7A and 7B, there is shown a third embodiment of the present invention. Piezoelectric vibrator 2 is formed of an LiNbO$_3$-Y cut. Piezoelectric constant d24 affects Z axis sensitivity, and d22 affects X axis sensitivity.

An Eulerian angle θ shown in the figure represents a value of coordinate transformation around X axis. By setting θ=165°±15°, d22 becomes minimum, while d11 is zero. Thus improved directivity of acceleration in Z axis direction is realized with high sensitivity.

By setting θ to either 20°±15°, 60°±15° or 100°±15°, two axes X and Z acceleration sensor can be realized.

Furthermore, in FIGS. 8A and 8B, a fourth embodiment of the present invention is shown. As mentioned above, in a configuration that X axis is rotated by Eulerian angle θ producing the torsion axis of piezoelectric vibrator 2 inconsistent with the polarization axis, a pattern of detection electrode 21 is separated into two along with a longitudinal direction of piezoelectric vibrator 2 (Z direction), as shown in FIG. 8A.

An example of a voltage distribution model in the above configuration is shown in FIG. 8B. Here, a thickness direction of piezoelectric vibrator (sensor) 2 is defined as X axis, a longitudinal direction thereof is defined as Y axis, and a width direction thereof is defined as Z axis.

In FIG. 8B, potential distribution is shown for Z, X and Y axes corresponding to each case of the above-mentioned Eulerian angle θ of 0°, 45° and 90°.

As an example, when θ is 0°, the detection electrodes are located along the potential distribution produced by the acceleration in Z direction. On the other hand, the detection electrodes are located perpendicularly to the potential distribution produced by the acceleration in X and Y directions, to cancel the potential. Accordingly a directional acceleration sensor in Z direction is realized.

When θ is 45°, the detection electrodes are located at a certain angle to the potential distribution produced by the acceleration in X, Y and Z directions. Therefore a non-directional acceleration sensor is obtained.

When θ is 90°, the detection electrodes are located perpendicularly to the potential distribution produced by the acceleration in Z direction to cancel the potential, while the detection electrodes are located along with the potential distribution produced by the acceleration in X and Y directions. Accordingly a directional acceleration sensor in two axes, X and Y, is formed. Needless to say, a non-directional acceleration sensor can be formed other than the case θ=45°.

In FIGS. 9A and 9B, a fifth embodiment of the present invention is shown. There is illustrated an example of potential distribution model in case a pattern is separated into two along with a width direction of piezoelectric vibrator 2.

Here, a thickness direction of piezoelectric vibrator 2 is defined as X axis, a longitudinal direction thereof is defined as Y axis, and a width direction thereof is defined as Z axis. When coordinate transformation of θ around X axis is 0°, the detection electrodes are located along with the potential distribution produced by the acceleration in X and Y axes, while the detection electrodes are located perpendicularly to the potential distribution produced by the acceleration in Z direction to cancel the potential. Accordingly a directional acceleration sensor in two axes, X and Y, is formed.

When θ is 45°, the detection electrodes are located at a certain angle to the potential distribution produced by the acceleration in X, Y and Z directions. Therefore a non-directional acceleration sensor is formed.

When θ is 90°, the detection electrodes are located along the potential distribution produced by the acceleration in Z direction, while the detection electrodes are located perpendicularly to the potential distribution produced by the acceleration in X and Y directions to cancel the potential. Accordingly a directional acceleration sensor in Z direction is formed.

As can be understood from the above description, by configuring two separate electrodes, an acceleration sensor arbitrarily having either directional or non-directional property can be realized. It may also be possible to construct an acceleration sensor with the provision of more than two electrodes based on the above principle.

Figure 10A:
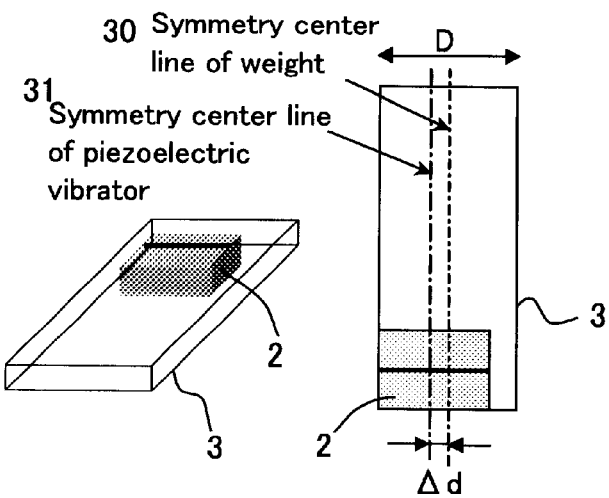
FIGS. 10A and 10B show a sixth embodiment of the present invention.
Figure 10B:
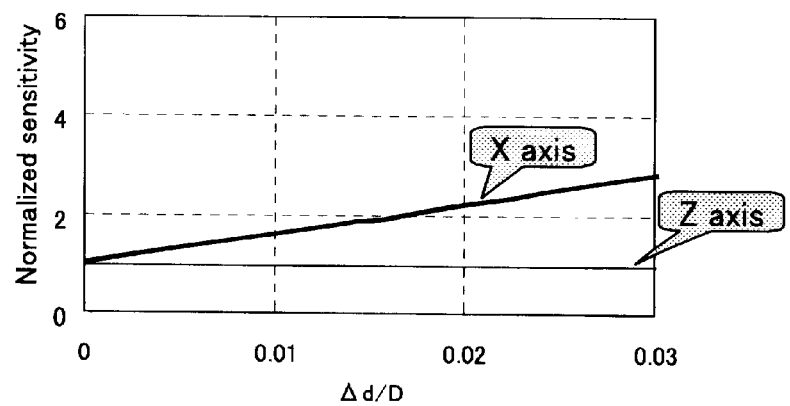

FIGS. 10A and 10B show a sixth embodiment of the present invention. In this embodiment, non-directivity is realized by disposing weight 3 and piezoelectric vibrator 2 in such positions that each symmetry center line in a width direction mutually deviates.

Similar to the embodiments explained above, when defining a thickness direction of piezoelectric vibrator 2 as X axis, a longitudinal direction as Y axis and a width direction as Z axis, a symmetry center line 31 of piezoelectric vibrator 2 is positioned with a deviation of Δd from a symmetry center line 30 of weight 3.

This produces improved sensitivity in X direction while maintaining the sensitivity in Z direction as shown in FIG. 10B, thus forming a non-directional acceleration sensor. In a graph shown in FIG. 10B, the axis of abscissa defines the aforementioned deviation of the central lines Ad normalized by the width D of the weight, and the axis of ordinate defines a normalized sensitivity. It may be understood from this graph that the sensitivity in X direction can be increased by increasing the deviation Δd.

Figure 11A:
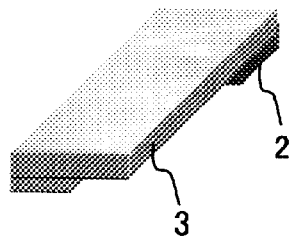
FIGS. 11A and 11B show an extended embodiment of the present invention according to the principle of the embodiment shown in FIG. 10A.
Figure 11B:
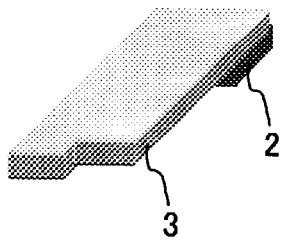

In FIGS. 11A and 11B, there are shown other embodiments using the principle applied in the embodiment illustrated in FIGS. 10A and 10B. In the embodiments, weight 3 is disposed so that its location of center of gravity deviates from the symmetry center line of piezoelectric vibrator 2 in a width direction. The same effect as in the embodiment shown in FIGS. 10A and 10B can be obtained.

In the embodiment shown in FIG. 11A, a thickness of weight 3 in a width direction is constructed inconsistently so as to produce the deviation of the center of gravity from the center line, while in the embodiment shown in FIG. 11B, the length of weight 3 in a width direction is constructed inconsistently so as to produce the deviation of the center of gravity from the center line.

In FIGS. 12A and 12B, another embodiment of the present invention is shown. Here, detection (output) electrodes are separated into a plurality of electrodes and detection output is derived from only one of these electrodes. In an embodiment example shown in FIG. 12A, detection electrodes 21 formed on piezoelectric vibrator 2 are separated into four sections 'a' to 'd', as shown in FIG. 12A, to obtain output from one electrode 'a' among four electrodes.

By this configuration, the same effect as obtained by the configuration having a center line of weight 3 deviating from that of piezoelectric vibrator 2 shown in FIG. 12A can be equivalently produced. A graph shown in FIG. 12B verifies the effect. It is to be understood that non-directional detection sensitivity for acceleration in X, Y and z directions can be achieved.

FIGS. 13A and 13B show a configuration for obtaining output with an improved SN ratio utilizing characteristics of the potential distribution for electrodes separated into four sections 'a' to 'd' in the embodiment shown in FIGS. 12A and 12B.

Here, a thickness direction of piezoelectric vibrator 2 is defined as X axis, a longitudinal direction as Y axis, and a width direction as Z axis. Also, a coordinate rotation angle around X axis is defined as θ. In FIG. 13B, there is shown an example of potential distribution of electrodes having four sections in case θ=0°.

In this configuration, differential detection is carried out using a pair of diagonally positioned electrodes among four sections. A non-directional acceleration sensor with improved SN ratio can thus be attained.

In FIGS. 14A and 14B, another embodiment of the present invention is shown. An example of separate electrodes of piezoelectric vibrator 2 is presented as illustrated in FIG. 14A, in which an area of one detection electrode is constructed larger than the other electrode. Defining a thickness direction of piezoelectric vibrator 2 as X axis, a longitudinal direction as Y axis, a width direction as Z axis, and coordinate rotation angle around X axis as θ, it is understood that non-directional acceleration detection in X, Y and Z directions can also be obtained by this embodiment, as shown in FIG. 14B.

According to the present invention, as various embodiments having been explained using the accompanied drawings, an acceleration detection sensor having either directional or non-directional sensitivity can be presented using an easy method of adjusting torsion axis and polarization axis of the piezoelectric vibrator, and with simple configuration and mounting of electrodes.

Moreover, according to the present invention, a variety of acceleration sensors are realized, which include a non-directional sensor for detecting acceleration of which components having in tri-axial directions of X, Y and Z axes or in bi-axial directions, and a directional acceleration sensor for detecting acceleration in one direction, using a sensor of a single configuration.

The foregoing description of the embodiments is not intended to limit the invention to the particular details of the examples illustrated. Any suitable modification and equivalents may be made without departing from the scope of the invention. All equivalent features of the invention defined by the appended claims fall within the protection scope of the invention.

What is claimed is:

1. An acceleration sensor comprising:
   a vibrator having unidirectional polarization;
   a weight connected to said vibrator;
   the weight being supported at a position deviating from the center of gravity of the entity of the vibrator and the weight; and
   a plurality of separate detection electrodes formed on one side of the vibrator.

2. The acceleration sensor according to claim 1, wherein one electrode out of said plurality of separate detection electrodes has different area ration from the other electrodes.

3. The acceleration sensor according to claim 1, wherein the vibrator and the weight are disposed in a different center line position of line symmetry in a width direction.

4. The acceleration sensor according to claim 1, wherein the center of gravity of said weight is positioned deviating from a center line of line symmetry in a width direction of the vibrator.

5. The acceleration sensor according to claim 1, wherein the vibrator is a piezoelectric vibrator formed of either a piezoelectric single crystal or a piezoelectric polycrystal.

6. The acceleration sensor according to claim 1, wherein said plurality of separate detection electrodes of the vibrator is formed through etching, dicing or a similar process.

7. The acceleration sensor according to claim 1, wherein the vibrator comprises two separate detection electrodes respectively formed in parallel with a torsion direction of the vibrator.

8. The acceleration sensor according to claim 1, wherein the vibrator comprises two separate detection electrodes respectively formed perpendicularly to a torsion direction of the vibrator.

9. An acceleration sensor comprising:
   a vibrator having unidirectional polarization;
   a weight connected to said vibrator, the weight being supported at a position deviating from the center of gravity of the entity of the vibrator and the weight; and
   a plurality of separate electrodes formed on one side of the vibrator, at least one out of which is a detection electrode.

* * * * *